(12) United States Patent
Kojima

(10) Patent No.: US 10,144,298 B2
(45) Date of Patent: Dec. 4, 2018

(54) POWER SUPPLY DEVICE OF VEHICLE

(71) Applicant: TOYOTA JIDOSHA KABUSHIKI KAISHA, Toyota-shi, Aichi-ken (JP)

(72) Inventor: Koichi Kojima, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 329 days.

(21) Appl. No.: 15/094,303

(22) Filed: Apr. 8, 2016

(65) Prior Publication Data

US 2016/0297310 A1    Oct. 13, 2016

(30) Foreign Application Priority Data

Apr. 10, 2015 (JP) .................. 2015-080874

(51) Int. Cl.
*B60L 1/00* (2006.01)
*H02G 3/00* (2006.01)
*B60L 11/18* (2006.01)
*B60L 3/00* (2006.01)

(52) U.S. Cl.
CPC ............. *B60L 11/1816* (2013.01); *B60L 3/00* (2013.01); *B60L 11/1818* (2013.01); *B60L 2240/80* (2013.01); *Y02T 10/7005* (2013.01); *Y02T 10/7072* (2013.01); *Y02T 90/14* (2013.01)

(58) Field of Classification Search
CPC .... B60L 11/1816; B60L 11/1818; B60L 3/00; B60L 2240/80; Y02T 10/7005; Y02T 10/7072; Y02T 90/14
USPC ........................................................ 307/10.1
See application file for complete search history.

(56) References Cited

FOREIGN PATENT DOCUMENTS

JP          2012209995 A    10/2012
JP          2013-106363 A    5/2013

*Primary Examiner* — Rexford N Barnie
*Assistant Examiner* — Toan T Vu
(74) *Attorney, Agent, or Firm* — Oliff PLC

(57) ABSTRACT

A power supply device of a vehicle includes a power storage device that can be charged by receiving power from outside the vehicle, an inlet to which a charging connector of an outside charger is connected, a connector connection detection circuit that detects whether the charging connector is connected to the inlet, a charging relay that connects the power storage device to the inlet, and an ECU that controls the connector connection detection circuit and the charging relay. The ECU performs an operation confirmation to determine whether the connector connection detection circuit is operating normally to detect the connection of the charging connector in the state in which the charging connector is connected to the inlet and the charging relay is in the OFF state.

5 Claims, 4 Drawing Sheets

POWER SUPPLY DEVICE OF VEHICLE

INCORPORATION BY REFERENCE

The disclosure of Japanese Patent Application No. 2015-080874 filed on Apr. 10, 2015 including the specification, drawings and abstract is incorporated herein by reference in its entirety.

BACKGROUND

1. Technical Field

The present disclosure relates to a power supply device of a vehicle, and more particularly to a power supply device of a vehicle that has a power storage device configured to be able to be charged from outside the vehicle.

2. Description of Related Art

Japanese Patent Application Publication No. 2012-209995 (JP 2012-209995 A) discloses a vehicle that can have its on-vehicle drive battery charged by a charger from outside the vehicle via a charging cable. This charger and the vehicle each have a connection detection unit for detecting that the charging cable is connected to the vehicle.

There is a possibility that a vehicle, which can have its battery charged from outside the vehicle, starts moving without noticing that the connector of the charging cable stays connected to the inlet (charging port) of the vehicle. In such a case, the vehicle moves while dragging the charging cable, sometimes resulting in damage to the inlet or the connector. To prevent a vehicle from moving while dragging the charging cable, the vehicle is controlled so that it cannot start moving if the connection detection unit detects that the charging cable is connected to the vehicle.

However, if the connection detection unit fails, the state of connector connection cannot be detected correctly with the result that the vehicle is permitted to start moving. This meaning that, in such a case, the configuration described above cannot prevent the vehicle from starting moving while dragging the charging cable. It is therefore preferable that the operation of the connection detection unit be confirmed regularly.

However, as will be described later with reference to FIG. 2 and FIG. 3, the operation confirmation of the connection detection unit, if performed in the configuration disclosed in Japanese Patent Application Publication No. 2012-209995 (JP 2012-209995 A), generates a sneak current even if the ground line is disconnected, sometimes with the result that charging is permitted. From the viewpoint of preventing an electrical leakage in the power line, it is undesirable to charge the battery with the ground line disconnected. Therefore, special care is required when performing the operation confirmation of the connection detection unit.

SUMMARY

The disclosed embodiments provide a power supply device of a vehicle that can perform the operation confirmation of the connector connection detection unit at an appropriate time.

According to one aspect, a power supply device of a vehicle includes a power storage device configured to be charged by receiving power from outside the vehicle; an inlet configured to be connected to a charging connector of a charger outside the vehicle; a connector connection detection circuit that detects whether the charging connector is connected to the inlet; a charging relay that connects the power storage device to the inlet; a power line that is connected to the power storage device via the charging relay; a first signal line defining a path through which a current flows to the connector connection detection circuit; a second signal line through which a charging permission command and a charging inhibition command are selectively sent from the vehicle to the charger; a ground line that makes a ground potential of the vehicle equal to a ground potential of the charger; and an electronic control unit that controls the connector connection detection circuit and the charging relay. The power line, the first signal line, the second signal line, and the ground line are connected to corresponding lines of the charger when the charging connector is connected to the inlet. While the connector connection detection circuit is not in operation, the second signal line has a state thereof fixed so that the second signal line indicates a charging inhibition command when the ground line is disconnected. While the connector connection detection circuit is in operation, the second signal line indicates a charging permission command by a current flowing via the first signal line even when the ground line is disconnected. The electronic control unit does not perform an operation confirmation, which is performed to confirm whether the connector connection detection circuit operates normally to detect the connection of the charging connector, when the charging relay is in an ON state. The electronic control unit performs the operation confirmation of the connector connection detection circuit when the charging relay is in an OFF state regardless of whether the charging permission command or the charging inhibition command is sent through the second signal line.

When a failure in the connector connection detection circuit or a line disconnection in the connector connection detection line is generated, the generation of the failure or the line disconnection can be detected before starting moving of the vehicle by performing the operation confirmation of the connector connection detection circuit as described above. Therefore, an action can be taken (for example, a warning is issued or the vehicle is inhibited from moving) to prevent the driver from moving the vehicle while dragging the charging cable with that cable still connected. In addition, the electronic control unit performs the operation confirmation of the connector connection detection circuit by selecting a time, during which the charging power is blocked, regardless of the state of the command signal on the second signal line. Therefore, an abnormality in the potential of the second signal line, if generated during the operation confirmation, does not adversely affect the charging system.

Preferably, the electronic control unit may send the charging permission command to the charger by causing a current to flow through the second signal line. A first current path is formed by the second signal line and the ground line. A second current path is formed by the second signal line, the connector connection detection circuit, and the first signal line. Because the second current path is not formed while the connector connection detection circuit is not in operation, the second signal line is not able to send the charging permission command when the ground line is disconnected.

The circuit is configured as described above. Therefore, while the connector connection detection circuit is not in operation, the charging permission command is not sent to the charger when the ground line is disconnected and, therefore, the charger does not send the charging power to the power line. However, while the connector connection detection circuit is in operation, a current flows through the second current path even when the ground line is disconnected and, therefore, the charging permission command may be sent from the vehicle. Hence, the electronic control unit causes the connector connection detection circuit to operate only when the charging relay is turned off, thus preventing the charging current from flowing when the ground line is disconnected.

More preferably, the power supply device further includes a communication line for communicating with the charger. The communication line is connected to a corresponding communication line of the charger when the charging connector is connected to the inlet. When the operation confirmation of the connector connection detection circuit is performed after a communication with the charger via the communication line is established, the electronic control unit determines that the connector connection detection circuit operates normally when a current via the first signal line flows through the connector connection detection circuit and determines that the connector connection detection circuit does not operate normally when a current via the first signal line does not flow through the connector connection detection circuit.

In the state described above, the establishment of communication indicates that the charging connector is connected to the inlet. Therefore, if the detection result of the connector connection detection circuit indicates the connection of the charging connector, the connector connection detection circuit is determined to be normal. Conversely, if the detection result does not indicate the connection of the charging connector, the connector connection detection circuit is determined to be abnormal.

Preferably, the electronic control unit performs the operation confirmation of the connector connection detection circuit after the charging connector is connected to the inlet and before the charging relay is turned on to start charging the power storage device.

In addition, preferably, the electronic control unit performs the operation confirmation of the connector connection detection circuit after the charging of the power storage device is terminated and the charging relay is turned off and before the charging connector is removed from the inlet.

Performing the operation confirmation of the connector connection detection circuit at the timing described above gives a chance to perform operation confirmation at each charging time. In addition, even when the ground line is disconnected, a sneak current that flows via the connector connection detection circuit is not generated and, therefore, charging is not permitted.

Preferably, the power supply device further includes a connector lock mechanism that locks the charging connector to the inlet. The electronic control unit performs the operation confirmation of the connector connection detection circuit when the charging connector is locked to the inlet by the connector lock mechanism.

In the state described above, the state of the connector lock mechanism indicates that the charging connector is connected to the inlet. Therefore, if the detection result of the connector connection detection circuit indicates the connection of the charging connector, the connector connection detection circuit is determined to be normal. Conversely, if the detection result does not indicate the connection of the charging connector, the connector connection detection circuit is determined to be abnormal.

According to the above aspect, the operation confirmation of the connector connection detection unit can be performed even when the insulation of the power line is reduced.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
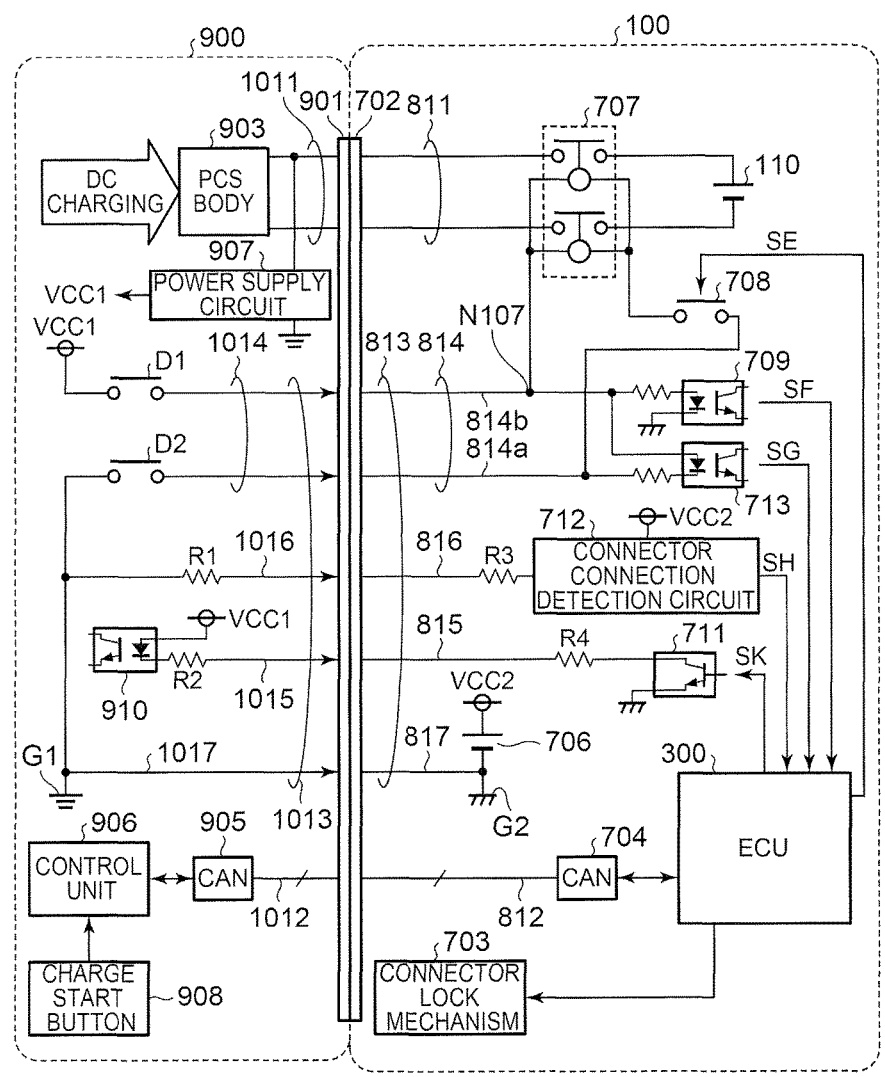
FIG. 1 is a diagram showing a configuration of a vehicle that can be charged in the DC charging mode, a power conditioner, and a power-feeding connector.

An embodiment is described in detail below with reference to the drawings. In the description below, the same reference numeral is used for the same or equivalent component and the duplicated description is not repeated.

A vehicle in this embodiment can have its on-vehicle battery charged in the "DC charging mode". The DC charging mode is a mode in which the power storage device of a vehicle is charged using power from an external DC power supply. In many cases, the DC charging mode allows the power storage device to be charged more quickly than in the AC charging mode.

FIG. 1 is a diagram showing the configuration of a vehicle that can be charged in the DC charging mode and a charger provided outside the vehicle. Referring to FIG. 1, in the DC charging mode, a vehicle 100 is connected to a charger 900 that charges an on-vehicle battery (power storage device 110) from outside the vehicle. In the DC charging mode, the AC power received from a commercial power supply, which is supplied to a house, is converted to the DC power by the charger 900 and is supplied to the power storage device 110 via a DC charging connector 901 and a DC inlet 702.

The charger 900 includes a DC charging connector 901, a power conditioning system (PCS) body 903, a CAN communication unit 905, a control unit 906, a power supply circuit 907, relays D1 and D2, a photo-coupler 910, and a charge start button 908.

A power line pair 1011, a communication signal line 1012, and control signal lines 1013 are provided in one charging cable. The power line pair 1011 is a pair of power lines via which power is sent and received between the vehicle 100 and the charger 900, and the communication signal line 1012 is a communication line for communicating with the vehicle 100. The control signal lines 1013 include a control power line pair 1014, a charging permission/inhibition signal line 1015, a connector connection confirmation signal line 1016, and a ground line 1017 connected to the ground potential G1.

The DC charging connector 901, provided at the leading end of the charging cable, has the terminals of the lines (power line pair 1011, communication signal line 1012, and control signal lines 1013) provided in the charging cable. When the DC charging connector 901 is connected to the DC inlet 702 of the vehicle 100, the power line pair 1011, communication signal line 1012, and control signal lines 1013 are electrically connected, respectively, to the corresponding lines (a power line pair 811, a communication line 812, and control communication lines 813) of the vehicle 100.

The PCS body 903 converts a power, supplied from the commercial power supply at a charging time, from AC to DC.

The CAN communication unit 905 communicates with the vehicle 100 via the communication signal line 1012 according to the communication protocol of controller area network (CAN).

The control unit 906 controls relays D1 and D2 and the PCS body 903 based on the signals received from the photo-coupler 910 and the CAN communication unit 905.

The power supply circuit 907 is a power supply for supplying driving power to the units of the communication and control system such as the CAN communication unit 905, control unit 906, relays D1 and D2, and photo-coupler 910. This power supply circuit 907 receives a DC power, output from the PCS body 903, and generates a power supply potential VCC1 used for control operations.

The relay D1, arranged between the VCC1 output terminal of the power supply circuit 907 and the cathode line of the control power line pair 1014, connects and disconnects the electric current path between the cathode line of the control power line pair 1014 and the power supply potential VCC1 according to the control signal received from the control unit 906.

The relay D2, arranged between the ground potential and the anode line of the control power line pair 1014, connects and disconnects the electric current path between the anode line of the control power line pair 1014 and the ground line according to the control signal received from the control unit 906.

The photo-coupler 910 transfers the operation permission/inhibition switching signal, generated depending upon whether the charging permission/inhibition signal line 1015 is electrically continuous, to the control unit 906.

The vehicle 100 includes the DC inlet 702, the power storage device 110, a CAN communication unit 704, an ECU 300, a charging relay 707, a relay 708, photo-couplers 709 and 713, a signal driver 711, a connector connection detection circuit 712, and a connector lock mechanism 703.

The DC inlet 702 includes the terminals of the power line pair 811, communication line 812, and the control communication lines 813. The power line pair 811 is a power line that receives a supply of charging power from the charger 900, and the communication line 812 is a communication line for communicating with the charger 900. The control communication lines 813 includes a control power supply line pair 814, a charging permission/inhibition signal line 815, a connector connection confirmation signal line 816, and a ground line 817 connected to the ground potential G2.

When the DC charging connector 901 of the charger 900 is connected to the DC inlet 702, the power line pair 811, communication line 812, and control communication lines 813 on the vehicle side are electrically connected respectively to the power line pair 1011, communication signal line 1012, and control signal lines 1013 on the charger 900 side.

The power storage device 110 is a battery that supplies driving power to the drive train of the vehicle 100 such as the drive motor, inverter, and so on. As the power storage device 110, a nickel-metal hydride secondary battery or a lithium ion secondary battery may be used, for example.

The CAN communication unit 704 communicates with the charger 900 via the communication line 812 according to the communication protocol of the CAN. The ECU (Electronic Control Unit) 300 integrally controls the components of the vehicle 100. The ECU 300 may be an ECU that is provided separately from the control unit for traveling and is started when power is charged from, or discharged to, a unit outside the vehicle. The ECU 300 includes, for example, a central processing unit (CPU), and memory such as ROM and RAM.

A power supply potential VCC2 is supplied, as the driving power, from an accessory battery 706 to the units of the communication system and the control system such as the CAN communication unit 704, ECU 300, relay 708, photo-couplers 709 and 713, connector connection detection circuit 712, and signal driver 711.

The charging relay 707, arranged between the power line pair 811 and the cathode/anode of the power storage device 110, connects and disconnects between the power storage device 110 and the power line pair 811. The charging relay 707 is a contact that is open when the control power is not turned on. When a driving power is supplied from the charger 900 via a line 814b with the relay 708 closed, the charging relay 707 is closed by this driving power and the power line pair 811 is connected to the power storage device 110.

The relay 708, arranged between the charging relay 707 and a line 814a, establishes or breaks the electrical current continuity of the driving coil of the charging relay 707 according to the signal SE received from the ECU 300.

The photo-coupler 709 transfers the signal SF to the ECU 300 as a command to request that charging be started or stopped according to the open/close state of the relay D1 of the charger 900 the connector of which is connected. More specifically, the light-emitting element on the input side is arranged between the cathode line of the control power supply line pair 814 and a ground potential G2 and is connected in series with a resistor. When the relay D1 of the charger 900, the connector of which is connected, is closed, an electric current path is formed between the line 814b and the ground potential G2 and, when the ON-state current flows into the light emitting element on the input side, the photosensitive element on the output side outputs the signal SF to the ECU 300.

The photo-coupler 713 transfers the signal SG to the ECU 300 as a command to request that operation be started or stopped according to the open/close state of the two relays, D1 and D2, of the charger 900 the connector of which is connected. More specifically, the light-emitting element on the input side is arranged between the cathode line and the anode line of the control power supply line pair 814. When the relays D1 and D2 of the charger 900, the connector of which is connected, are closed and the ON-state current flows from control power supply line pair 814 to the light-emitting element on the input side, the photosensitive element on the output side outputs the signal SG to the ECU 300.

The signal driver 711 couples the charging permission/inhibition signal line 1015 of the charger 900, the connector of which is connected, to the ground potential G2 according to the signal SK received from the ECU 300. More specifically, the signal driver 711 is arranged between the charging permission/inhibition signal line 815 and the ground potential and, when the ON-state current flows into the base electrode of the signal driver 711 via the signal SK received from the ECU 300, the charging permission/inhibition signal line 815 is coupled to the ground potential G2. Then, the electric current flows into the light-emitting element on the input side of the photo-coupler 910, the photo-coupler 910 becomes electrically continuous, and the "permit charging" command is sent to the control unit 906.

The connector connection detection circuit 712 transfers the signal SH, which indicates the connection state between the DC charging connector 901 and the DC inlet 702, to the ECU 300. For example, when a photo-coupler is used as the connector connection detection circuit 712, the light-emitting element on the input side is arranged between the cathode (power supply potential VCC2) of the accessory battery 706 and the connector connection confirmation signal line 816. When the DC charging connector 901 is connected to the DC inlet 702, the connector connection confirmation signal line 816 is connected to the connector connection confirmation signal line 1016 and, as a result, the ON-state current flows into the light-emitting element on the input side, the connector connection detection circuit 712 outputs the signal SH to the ECU 300. The connector connection detection circuit 712, which may be configured in various ways, is not limited to a photo-coupler.

Figure 2:
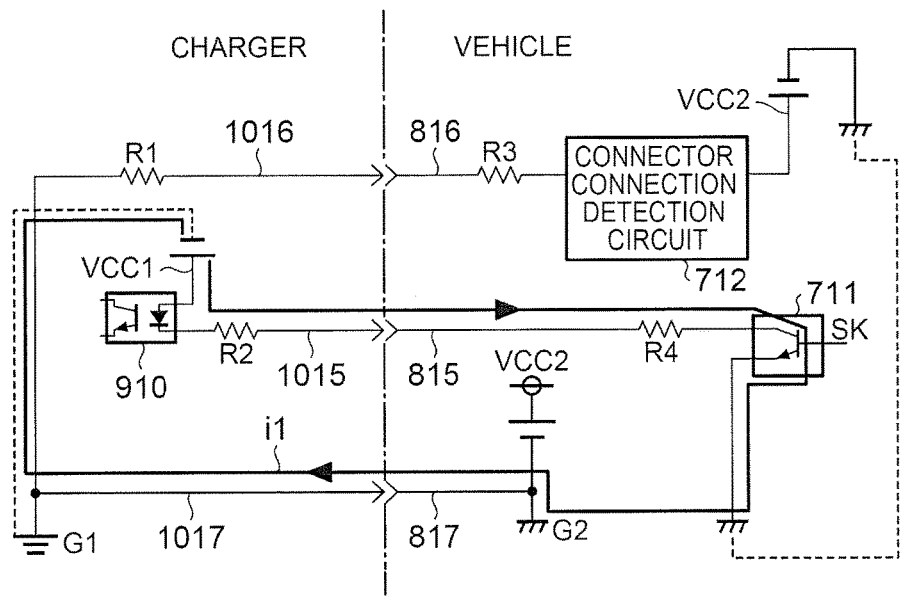
FIG. 2 is a diagram showing an electric current that flows through a charging permission/inhibition signal line 815 via a normal route.

FIG. 2 is a diagram showing an electric current that flows through the charging permission/inhibition signal line 815 via a normal route. Referring to FIG. 2, the charging permission/inhibition signal line 815, a dedicated signal line, is provided as a path via which the control signal, which indicates "permit charging"/"inhibit charging", is sent from the vehicle to the charger.

The charger 900 recognizes that the state is "permit charging" when an electric current flows through the charging permission/inhibition signal line 815 from the charger 900 to the vehicle 100, and recognizes that the state is "inhibit charging" when an electric signal does not flow through the dedicated communication line. The ground lines 817 and 1017 are provided as a path via which this electric current returns from the vehicle 100 to the charger 900.

The ECU 300 of the vehicle turns on the signal driver 711 to output the signal, which indicates "permit charging", to the charger 900. Then, an electric current i1, indicated by the arrow in FIG. 2, flows. The electric current i1 flows from the power supply potential VCC1 to the body earth line (G2) of the vehicle via the photo-coupler 910, resistor R2, charging permission/inhibition signal line 1015, charging permission/inhibition signal line 815, resistor R4, and signal driver 711, and returns to the charger 900 via the ground lines 817 and 1017.

These ground lines 817 and 1017 are important as measures for preventing an electrical leakage in that the ground potential G1 of the charger 900 and the ground potential G2 of the vehicle 100 are set at the same potential. Therefore, if the ground line 817 or the ground line 1017 is disconnected, it is desirable that charging not be permitted. If one of the ground lines 817 and 1017 is disconnected, the charger 900 recognizes that the state is the "inhibit charging" state because an electric current does not flow through the charging permission/inhibition signal line 815. Therefore, even if an electrical leakage has occurred, the voltage disappears and no electrical leakage occurs because charging is not performed.

That is, if the ground line 817 or the ground line 1017 is disconnected, a closed circuit, in which an electric current flows, is not usually formed and, therefore, the control signal indicating "inhibit charging" is sent to the charger 900.

However, depending upon the timing at which the connector connection detection circuit 712 is operated, the signal indicating "permit charging" may be sent to the charger 900 as will be described below.

Figure 3:
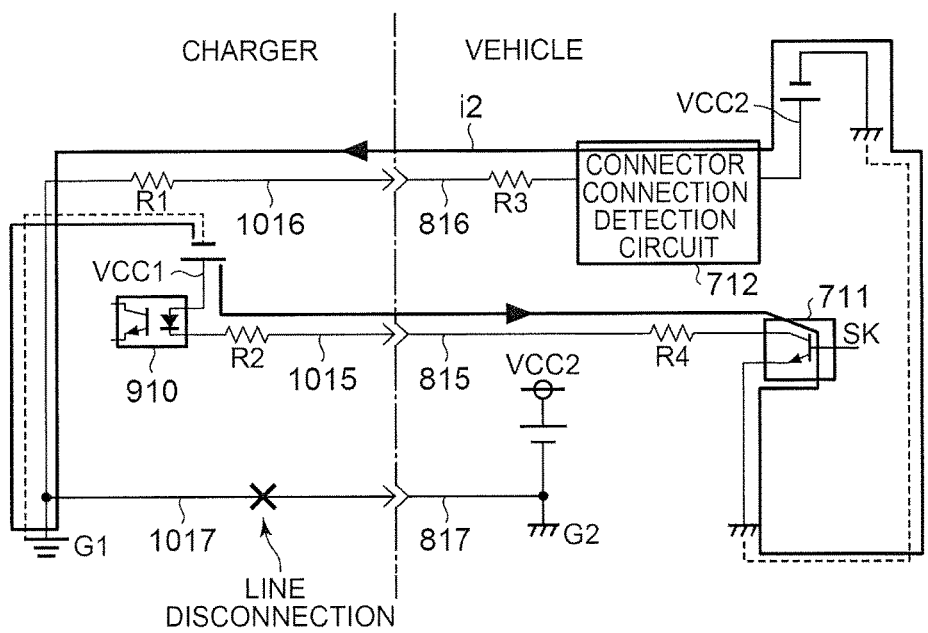
FIG. 3 is a diagram showing a case in which an electric current flows through the charging permission/inhibition signal line 815 via an abnormal route.

FIG. 3 is a diagram showing a case in which an electric current flows through the charging permission/inhibition signal line 815 via an abnormal route. Referring to FIG. 3, when the operation confirmation of the connector connection detection circuit 712 is performed, a path is established via which an electric current flows from the vehicle 100 side to the charger 900 side. Therefore, when the operation confirmation of the connector connection detection circuit 712 is performed, a sneak current is generated with the result that a closed circuit, in which an electric current flows through the charging permission/inhibition signal line 815, is formed even if the ground line 817 or the ground line 1017 is disconnected. Therefore, the charger 900 may recognize that the state is "permit charging". For preventing an electrical leakage in the power line pair 811 in FIG. 1, it is not desirable that the signal indicating "permit charging" be sent when the ground line 817 or the ground line 1017 is disconnected.

For example, assume that a line disconnection occurs on the ground line 1017 as shown in FIG. 3. In this case, the ground potential G2 on the vehicle side and the ground potential G1 of the charger 900 are not at the same potential, meaning that their relation is in the floating state. In such a state, if an operation check is made for the connector connection detection circuit 712 with the signal driver 711 turned on, an electric current i2, indicated by the arrow in FIG. 3, flows. The electric current i2 flows from the power supply potential VCC1 through the vehicle and back to the body earth line (G1) of the charger via the photo-coupler 910, resistor R2, charging permission/inhibition signal line 1015, charging permission/inhibition signal line 815, resistor R4, signal driver 711, connector connection detection circuit 712, resistor R3, connector connection confirmation signal line 816, connector connection confirmation signal line 1016, and resistor R1. When an electric current flows through the charging permission/inhibition signal line 815, the charger 900 recognizes that the state is "permit charging", with the possibility that the charging voltage is sent from the charger 900 to the vehicle. In this case, some measures must be taken against an electrical leakage that occurs in the power line pair 811 shown in FIG. 1.

Therefore, it is desirable that the operation check of the connector connection detection circuit 712 be made during the charging sequence except when the charging relay 707 is electrically continuous (electrically conductive).

Referring to FIG. 1 again, the operation check of the connector connection detection circuit 712 is made in this embodiment except when the charging relay 707 is electrically continuous. That is, with the charging connector 901 connected to the inlet 702 and with the charging relay 707 turned off, the ECU 300 performs the operation confirmation of the connector connection detection circuit 712 to see if the connector connection detection circuit 712 detects the connection of the charging connector 901 correctly.

In the configuration shown in FIG. 1, when the charging connector 901 is connected to the inlet 702, the power line pair 811, connector connection confirmation signal line 816, charging permission/inhibition signal line 815, and ground line 817 are connected respectively to the power line pair 1011, connector connection confirmation signal line 1016, charging permission/inhibition signal line 1015, and ground line 1017 that are corresponding lines on the charger 900 side. The ECU 300 turns off the charging relay 707 to create a state in which an electric current does not flow through the power line pair 811 regardless of whether the contents of the command sent via the charging permission/inhibition signal line 815 are "permit charging" or "inhibit charging". In this state, the ECU 300 performs the operation confirmation of the connector connection detection circuit 712.

Figure 4:
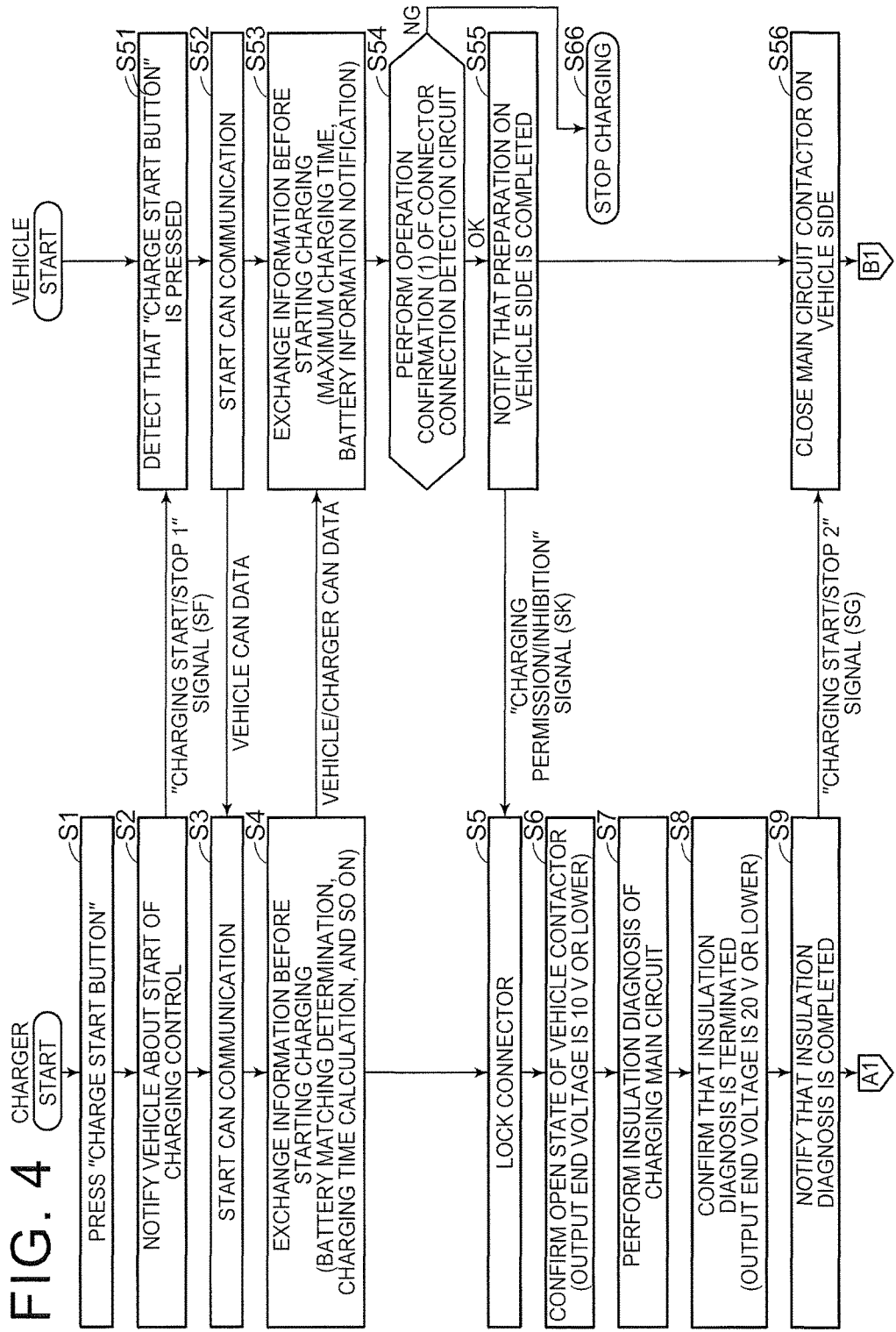
FIG. 4 is a flowchart (first half) showing a charging sequence between a charger and a vehicle.
Figure 5:
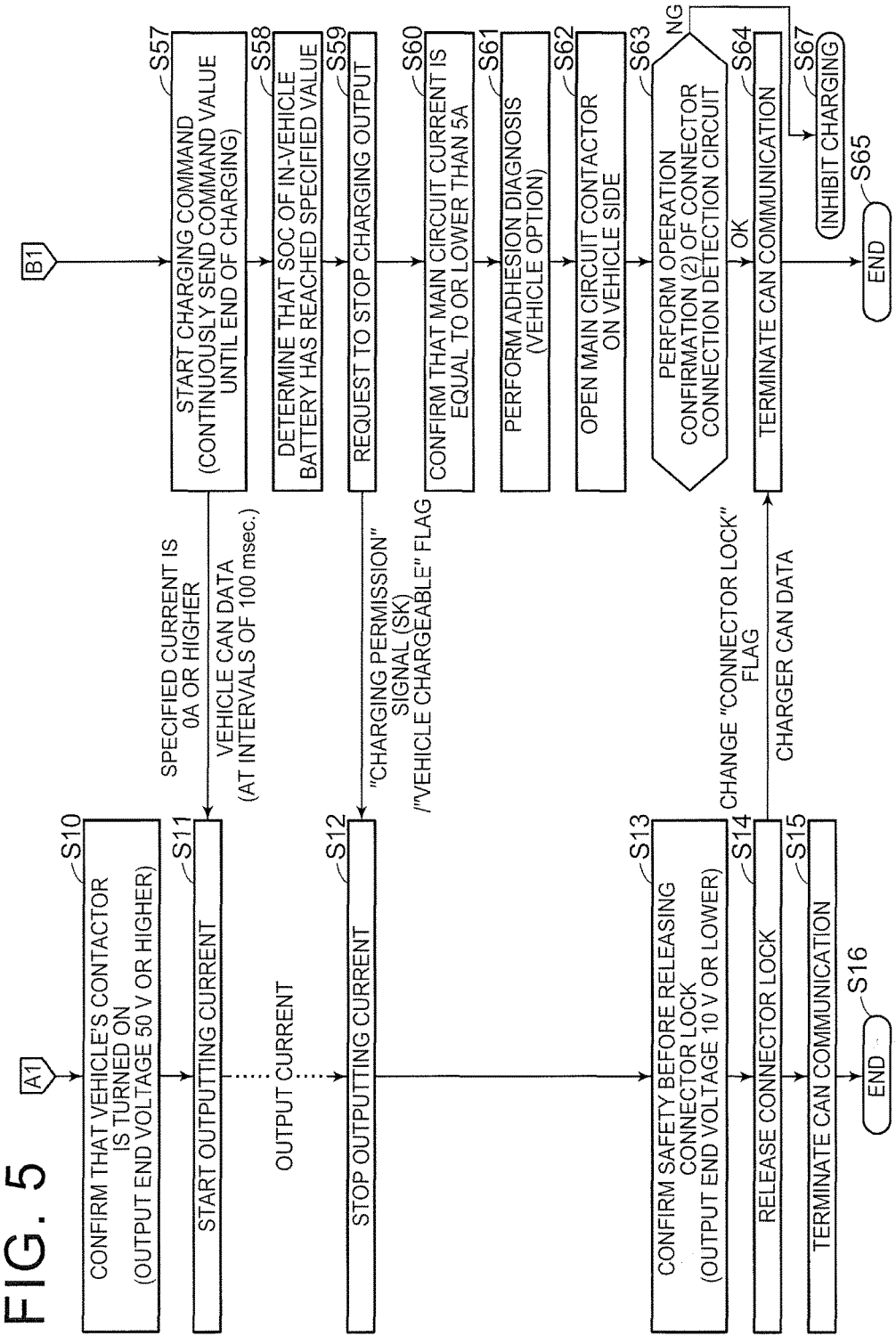
FIG. 5 is a flowchart (second half) showing a charging sequence between a charger and a vehicle.

This control is described in detail below with reference to the flowcharts. FIG. 4 is a flowchart (first half) showing the charging sequence between the charger and the vehicle. FIG. 5 is a flowchart (second half) showing the charging sequence between the charger and the vehicle.

Referring to FIG. 1 and FIG. 4, the charging flow is started when an operator presses the charge start button 908 of the charger 900 in step S1.

In step S2, the charger 900 notifies the vehicle about the start of charging control. More specifically, in response to a press on the charge start button, the control unit 906 of the charger 900 closes the relay D1. Then, the power supply potential VCC1 on the charger 900 side is supplied to the line 814b to excite the photo-coupler 709. The ECU 300 receives the signal SF to recognize that the charging operation is started. That is, the vehicle detects that the charge start button is pressed (step S51).

Next, in step S3 and step S52, the CAN communication is started between the charger 900 and the vehicle 100.

In step S53, the vehicle 100 transfers the parameters, such as the maximum voltage and the battery capacity of the battery, to the charger 900 via the CAN communication. In step S4, in response to this information, the charger 900 confirms that the vehicle matches the charger 900 and then sends the information, such as the maximum output voltage and the maximum output current of the charger 900, to the vehicle 100 via the CAN communication.

If the CAN communication is established at this time, it is already confirmed that the charging connector 901 is connected to the inlet 702. This timing is a good timing for performing the operation confirmation of the connector connection detection circuit 712 because the connector stays connected and the charging voltage is not applied to the power line. Therefore, after the communication with the charger 900 via the CAN communication line is established, the ECU 300 performs the operation confirmation of the connector connection detection circuit 712. By confirming at this timing whether the connector connection detection circuit 712 normally detects the connection of the charging connector 901, the operation of the connector connection detection circuit 712 can be confirmed.

Therefore, the operation confirmation (1) of the connector connection detection circuit 712 is performed in step S54. At this time, if the signal SH, output from the connector connection detection circuit 712, indicates "connector connected", the ECU 300 of the vehicle determines that the connector connection detection circuit 712 is operating normally and proceeds to the processing in step S55. Conversely, if the signal SH, output from the connector connection detection circuit 712, indicates "connector not-connected", the ECU 300 of the vehicle determines that the connector connection detection circuit 712 is failing, stops charging in step S66, and inhibits charging thereafter. In this case, the information about the failure, such as a warning display, is sent to the user as necessary.

Next, if it is determined, based on the signal received via the CAN communication, that the charger 900 and the vehicle 100 match and that there is no problem with the operation confirmation result of the connector connection detection circuit 712, the vehicle 100 establishes the electrical continuity of the signal driver 711 and notifies the charger 900 about the start of charging in step S55. In response to this notification, the charger 900 acknowledges in step S5 that the vehicle 100 has permitted charging and then locks the charging connector 901 so that it does not come off from the inlet 702. After that, the charger 900 applies a voltage to the power line pair 811 for a short time in step S6 and, in step S7, tests that there is not an abnormality, such as a short circuit or a ground fault, in the exit circuit including the connector interface. After insulation diagnosis is terminated in step S8, the charger 900 closes the relay D2 in step S9 to notify the vehicle 100 that all preparations for charging have been finished. The ECU 300 of the vehicle receives the signal SG from the photo-coupler 713 to recognize that the charger 900 is ready for charging. In this manner, the preparation for charging is completed.

After the preparation described above, charging is started according to the signal SG under control of the ECU 300 of the vehicle 100.

In step S56, the ECU 300 outputs the signal SE to establish the electrical continuity of the relay 708 to allow the drive current to flow through the charging relay 707.

The charger 900 recognizes that the charging relay 707 is connected when the voltage (50 V or higher) of the power storage device 110 is detected in the power line pair 1011 (step S10).

After that, in step S57, while monitoring the battery system, the ECU 300 of the vehicle 100 determines the maximum amount of electrical current that can be charged and sends the determined value to the charger 900 via the CAN communication at intervals of 100 ms. In step S11, the charger 900 supplies the current, which matches the specified current value, to the vehicle 100 under constant current control.

During this period, the vehicle 100 keeps on monitoring the state of charge (SOC) of the power storage device 110 of the vehicle 100 and the value of current supplied from the charger 900. If the SOC of the power storage device 110 reaches a specified value in step S58, the ECU 300 terminates charging. In step S59, the ECU 300 requests the charger 900 to stop the charging output. This charging output stop request is issued by sending a zero-current instruction value from the vehicle 100 side to the charger 900 via the CAN communication and by sending the signal SK from the ECU 300 to the signal driver 711 to block the current. When the signal driver 711 is turned off, "inhibit charging" is sent to the charger 900.

On the other hand, in step S12, the charger 900 confirms that the output current is zero and opens the relays D1 and D2.

Next, the ECU 300 confirms in step S60 that the charging current is equal to or lower than 5 A, performs relay adhesion diagnosis as necessary in step S61, and opens the charging relay 707 in step S62.

In this embodiment, the operation confirmation (2) of the connector connection detection circuit 712 is performed at this timing in step S63. At this time, if the signal SH, output from the connector connection detection circuit 712, indicates "connector connected", the ECU 300 of the vehicle determines that the connector connection detection circuit 712 is operating normally and, then, the processing proceeds to step S64. Conversely, if the signal SH, output from the connector connection detection circuit 712, indicates "connector not-connected", the ECU 300 of the vehicle determines that the connector connection detection circuit 712 is failing and, then, the processing proceeds to step S67 to inhibit charging thereafter. In this case, the information about the failure, such as a warning display, is sent to the user as necessary.

This timing is also a good timing for performing the operation confirmation of the connector connection detection circuit 712 because the connector stays connected and a charging voltage is not applied to the power line.

At this timing, more secure connection is ensured between the charging connector and the inlet, because not only the connection between the charging connector and the inlet is confirmed via the CAN communication but also the charging connector 901 is locked to the inlet 702 by the connector lock mechanism 703.

Therefore, it is more preferable that the ECU 300 perform the operation confirmation of the connector connection detection circuit 712 when the charging connector 901 is locked to the inlet 702 by the connector lock mechanism 703.

After charging is stopped, the charger 900 confirms in step S13 that the voltage of the exit circuit is equal to or lower than 10 V and, after that, changes the connector lock flag via the CAN communication to request the vehicle to release the connector lock. The connector lock is released in step S14 and, after the CAN communication is terminated in steps S15 and S64, a series of charging sequence steps is terminated in steps S16 and S65.

In FIG. 4, the ECU 300 performs the operation confirmation of the connector connection detection circuit 712 (step S54) after the charging connector 901 is connected to the inlet 702 and before the charging relay 707 is turned on to start charging the power storage device 110. In addition, in FIG. 5, the ECU 300 performs the operation confirmation of the connector connection detection circuit 712 after the charging of the power storage device 110 is terminated and the charging relay 707 is turned off and before the charging connector 901 is removed from the inlet 702. However, the ECU 300 need not always perform the operation confirmation twice but may perform it only once, either in the operation confirmation (1) of the connector connection detection circuit 712 in step S54 or in the operation confirmation (2) of the connector connection detection circuit 712 in step S63.

The embodiments disclosed herein are to be considered merely illustrative and not restrictive in any respect.

What is claimed is:

1. A power supply device of a vehicle comprising:
   a power storage device configured to be charged by receiving power from outside the vehicle;
   an inlet configured to be connected to a charging connector of a charger outside the vehicle;
   a connector connection detection circuit configured to detect whether the charging connector is connected to the inlet;
   a charging relay that connects the power storage device to the inlet;
   a power line that is connected to the power storage device via the charging relay;
   a first signal line defining a path through which a current flows to the connector connection detection circuit;
   a second signal line configured to selectively send a charging permission command and a charging inhibition command from the vehicle to the charger;
   a ground line configured to make a ground potential of the vehicle equal to a ground potential of the charger; and
   an electronic control unit configured to control the connector connection detection circuit and the charging relay,
   wherein the power line, the first signal line, the second signal line, and the ground line are configured to be connected to corresponding lines of the charger when the charging connector is connected to the inlet,
   while the connector connection detection circuit is not in operation, the second signal line is configured to have a state thereof fixed so that the second signal line indicates a charging inhibition command when the ground line is disconnected,
   while the connector connection detection circuit is in operation, the second signal line is configured to indicate a charging permission command by a current flowing via the first signal line even when the ground line is disconnected,
   the electronic control unit is configured to perform an operation confirmation of the connector connection detection circuit to confirm whether the connector connection detection circuit is operating normally to detect the connection of the charging connector, the electronic control unit performing the operation confirmation of the connector connection detection circuit when the charging relay is in an OFF state while the charging connector is connected to the inlet and no charging of the power storage device is taking place, and regardless of whether the charging permission command or the charging inhibition command is sent through the second signal line, and
   the electronic control unit is configured to not perform the operation confirmation of the connector connection detection circuit when the charging relay is in an ON state.

2. The power supply device according to claim 1, wherein
   the electronic control unit is configured to send the charging permission command to the charger by causing a current to flow through the second signal line,
   a first current path is formed by the second signal line and the ground line,
   a second current path is formed by the second signal line, the connector connection detection circuit, and the first signal line, and
   because the second current path is not formed while the connector connection detection circuit is not in operation, the second signal line is configured not to send the charging permission command when the ground line is disconnected.

3. The power supply device according to claim 1, further comprising:
   a communication line for communicating with the charger, wherein
   the communication line is configured to be connected to a corresponding communication line of the charger when the charging connector is connected to the inlet, and
   when the operation confirmation of the connector connection detection circuit is performed after a communication with the charger via the communication line is established, the electronic control unit (a) determines that the connector connection detection circuit operates normally when a current via the first signal line flows through the connector connection detection circuit, and (b) determines that the connector connection detection circuit does not operate normally when a current via the first signal line does not flow through the connector connection detection circuit.

4. The power supply device according to claim 1, wherein the electronic control unit is configured to perform the operation confirmation of the connector connection detection circuit after the charging connector is connected to the inlet and before the charging relay is turned on to start charging the power storage device.

5. The power supply device according to claim 1, wherein the electronic control unit is configured to perform the operation confirmation of the connector connection detection circuit after the charging of the power storage device is terminated and the charging relay is turned off and before the charging connector is removed from the inlet.

* * * * *